Patented Feb. 2, 1926.

1,571,447

UNITED STATES PATENT OFFICE.

TREVOR S. HUXHAM, OF BLOOMFIELD, NEW JERSEY, ASSIGNOR, BY MESNE ASSIGNMENTS, TO CARLETON ELLIS, OF MONTCLAIR, NEW JERSEY.

COMPOSITION FOR MOLDING AND PROCESS OF MAKING SAME.

No Drawing.  Application filed October 2, 1922. Serial No. 591,942.

*To all whom it may concern:*

Be it known that I, TREVOR S. HUXHAM, a citizen of the United States, residing at Bloomfield, in the county of Essex and State of New Jersey, have invented certain new and useful Improvements in Compositions for Molding and Processes of Making Same, of which the following is a specification.

This invention relates to a composition for molding and to the process of making same and relates especially to plastic compositions containing a binder derived by the reaction between an aldehyde and a phenol.

In molding plastic substances such as those made from the resinous condensation products of phenol and formaldehyde difficulty arises from time to time due to sticking of the material to the mold. The cause of sticking has not been definitely established and not infrequently causes trouble in molding establishments. However by greasing the molds or by adding a small amount of stearic acid to the molding composition a degree of lubrication is obtained which overcomes sticking in some cases. The requirements of present day molding frequently call for a plastic material which will set or become thermo-rigid when hot pressed and may be taken from the mold in a cured condition just as rubber is vulcanized. If the article sticks to the mold delay arises and the mold afterward has to be re-polished. It is possible to minimize sticking difficulties by chilling the article while still in the mold by placing in a cold press but this second operation consumes time and is not desired. Therefore a molding composition to be satisfactory should not give at the most more than very slight sticking difficulties.

Resins may be prepared by reacting with furfural on phenol and these resins may be admixed with fillers in the manner customary with the phenol formaldehyde products referred to above using for example any of the customary filling agents ordinarily employed in the plastic art. Wood flour being an example. The resinous material incorporated with filler to make a molding composition, even though it has the property of setting satisfactorily in the mold on heating and pressing, has the peculiarity of sticking to the mold to an inordinate degree. If this sticking were only slight such furfural resins might be more generally employed but even by using the hitherto employed mold lubricants, with their disadvantages of rendering the surface of the molded article greasy, or by using stearic acid in the molding composition sticking difficulties are constantly in evidence.

In the manufacture of matrices or printing plates molding with furfural resin is possible because a sheet of tin foil is interposed between the mold and the molding composition and this prevents sticking. For the usual run of molded articles however no such means are at hand to prevent sticking and in the present invention a composition will be described which although containing or consisting of furfural resin does not stick to the mold at least in any degree such as to preclude it from being used for commercial molding purposes.

The essential feature of the present invention is the incorporation in the molding composition containing resins which exhibit the sticking properties, for example the furfural resin of a small quantity of a metallic soap such as zinc stearate or aluminum palmitate and the like.

The term "metallic soap" has heretofore been used in the literature, as referring to the fatty acid or resin acid salts of the metals other than the alkali metals, such salts being insoluble in water (see for example page 266 of Ellis, Synthetic Resins and Their Plastics N. Y. 1923). The said term is employed in that sense in the present case, and is not intended to include water-soluble soaps such as ordinary soda or potash soaps.

Thus a resin may be made by heating 10 pounds of phenol, 7½ pounds of furfural and 1 pound of potassium carbonate under a reflux condenser for 3 hours at 145-155° C. Any excess of phenol is then removed by blowing with steam. The solid fusible resin obtained is used as the basis of a molding composition. For example as follows:

75 parts by weight of the resin are dissolved in an equal weight of denatured tallic soap, the latter being present in an amount not exceeding a few per cent of the entire quantity of the composition.

11. A molding composition comprising an admixture of a resinous binder which has the property of hardening when heated and which normally exhibits a tendency to sticking to the mold in hot molding operations, and a small amount of metallic soap, the latter being present in an amount not exceeding a few per cent of the entire quantity of the composition.

TREVOR S. HUXHAM.